US007992179B1

(12) United States Patent
Kapner, III et al.

(10) Patent No.: US 7,992,179 B1
(45) Date of Patent: Aug. 2, 2011

(54) SYSTEM AND METHOD FOR SELECTING A PAY PER VIEW PROGRAM TO BE TRANSMITTED TO A PROGRAM RECEIVER

(75) Inventors: L. Jeffrey Kapner, III, Yorba Linda, CA (US); Timothy J. Elliott, Fountain Valley, CA (US); Peter J. Schwartz, Fullerton, CA (US)

(73) Assignee: Keen Personal Media, Inc., Irvine, CA (US)

( * ) Notice: Subject to any disclaimer, the term of this patent is extended or adjusted under 35 U.S.C. 154(b) by 0 days.

(21) Appl. No.: 12/647,422

(22) Filed: Dec. 25, 2009

Related U.S. Application Data

(63) Continuation of application No. 10/035,763, filed on Dec. 21, 2001, now Pat. No. 7,653,927.

(51) Int. Cl.
  *H04N 7/173* (2011.01)
(52) U.S. Cl. .......... 725/95; 725/86; 725/87; 725/89
(58) Field of Classification Search .......... 725/54, 725/86, 87, 89, 95, 100, 101, 104
  See application file for complete search history.

(56) References Cited

U.S. PATENT DOCUMENTS

| | | | |
|---|---|---|---|
| 5,446,489 A | 8/1995 | Egendorf | |
| 5,654,747 A | 8/1997 | Ottesen et al. | |
| 5,699,104 A | 12/1997 | Yoshinobu | |
| 5,826,168 A | 10/1998 | Inoue et al. | |
| 5,850,218 A | 12/1998 | LaJoie et al. | |
| 6,018,612 A | 1/2000 | Thomason et al. | |
| 6,025,868 A | 2/2000 | Russo | |
| 6,072,982 A | 6/2000 | Haddad | |
| 6,157,377 A | 12/2000 | Shah-Nazaroff et al. | |
| 6,344,878 B1 * | 2/2002 | Emura | 348/460 |
| 6,483,986 B1 | 11/2002 | Krapf | |
| 6,545,722 B1 | 4/2003 | Schultheiss et al. | |
| 6,642,939 B1 | 11/2003 | Vallone et al. | |
| 6,701,528 B1 | 3/2004 | Arsenault et al. | |
| 6,757,906 B1 | 6/2004 | Look et al. | |
| 6,771,886 B1 * | 8/2004 | Mendelsohn | 386/83 |
| 2001/0051037 A1 | 12/2001 | Safadi et al. | |
| 2002/0056095 A1 | 5/2002 | Uehara et al. | |
| 2004/0078823 A1 * | 4/2004 | Schlarb et al. | 725/104 |
| 2005/0235323 A1 | 10/2005 | Ellis et al. | |

* cited by examiner

*Primary Examiner* — Christopher Kelley
*Assistant Examiner* — Timothy R Newlin

(57) ABSTRACT

The present invention may be regarded as personal video recorder and a method of selecting a pay per view program to be transmitted to a personal video recorder having a program receiver. A schedule of pay per view programs is obtained. Each of the pay per view programs has a title and at least one transmission time and an associated transmission channel for each transmission time. A title list comprising the titles of at least one pay per view program is generated based on the schedule. The title list is provided to a display device for display to a user. A selection by title of the pay per view program to be received by the program receiver is received from the user. A potential transmission time of the pay per view program to be received by the program receiver is determined based on the at least one transmission time. Alternatively, selection of the pay per view program to be received by the program receiver may be based on user's preferences or a pre-selected list of titles.

17 Claims, 5 Drawing Sheets

| CHANNEL | 8:00 P.M. | 8:30 P.M. | 9:00 P.M. | 9:30 P.M. | 10:00 P.M. | 10:30 P.M. |
|---|---|---|---|---|---|---|
| 100 | — | TITLE A (8:00) | — | TITLE A (9:00) | — | TITLE A (10:00) |
| 101 | TITLE A (6:30) | — | TITLE A (8:30) | — | TITLE A (9:30) | — |
| 102 | TITLE A (7:00) | — | — | TITLE A (9:00) | — | TITLE B |
| 103 | TITLE A (7:30) | — | — | — | TITLE A (9:30) | — |
| 104 | — | TITLE B (8:00) | — | TITLE B (9:00) | — | TITLE B (10:00) |
| 105 | TITLE B (6:30) | — | TITLE B (8:30) | — | TITLE B (9:30) | — |
| 106 | TITLE B (7:00) | — | — | TITLE B (9:00) | — | TITLE B |
| 107 | TITLE B (7:30) | — | — | — | TITLE B (9:30) | — |
| 108 | — | TITLE C (8:00) | — | TITLE C (9:00) | — | TITLE C (10:00) |
| 109 | TITLE C (6:30) | — | TITLE C (8:30) | — | TITLE C (9:30) | — |
| 110 | TITLE C (7:00) | — | — | TITLE C (9:00) | — | TITLE C |
| 111 | TITLE C (7:30) | — | — | — | TITLE C (9:30) | — |

PROGRAM GUIDE - JANUARY 1, 2000

SYSTEM AND METHOD FOR SELECTING A PAY PER VIEW PROGRAM TO BE TRANSMITTED TO A PROGRAM RECEIVER

CROSS-REFERENCE TO RELATED APPLICATIONS

This application is continuation of U.S. patent application Ser. No. 10/035,763, filed Dec. 21, 2001.

BACKGROUND OF THE INVENTION

1. Field of the Invention

The invention generally relates to transmitting data to a program receiver, and more particularly, the invention relates to a system and method for selecting a pay per view program to be transmitted to a program receiver.

2. Description of the Prior Art

A digital video recorder (DVR), like a conventional analog video cassette recorder (VCR), is coupled to a monitor or a television set in a viewer's home and receives program broadcast signals via a coaxial cable, a satellite dish, or an antenna for terrestrial radio frequency (RF) signals. In some instances, the DVR may include a modem that permits access to content from the Internet. In order to record a particular program, the video recorder starts and stops recording the program at a predetermined day and time.

A DVR allows a viewer the ability to time shift in order to overcome the rigid time scheme according to which the programs are broadcast. That is, a viewer can decide whether to watch "live TV" or to record a program and watch it later at a more convenient day and time. Alternative systems provide for even more flexibility and viewer-specific television. For example, digital video recorders offered by Replay Networks® of Palo Alto, Calif. (in combination with ReplayTV™ service) and Philips® of Eindhoven Netherlands (in combination with TiVo® service of Sunnyvale, Calif.) include a hard disk drive for storing program content. These digital video recorders, also referred to as personal video recorders (PVRs), and the respective services allow the viewer to personalize their television viewing experience. For instance, personal video recorders can learn a viewer's preference or taste for programs and automatically record programs that it expects a viewer to like, based on a recommendation device (or software). The viewer can also, among other activities, watch and pause live TV (known in the industry as "trick play"). That is, the viewer can operate a remote control to pause a broadcast of a favorite show (for example, when someone calls), and resume the show again, exactly where the viewer left the program.

The available programs may include pay per view programs that may be played repeatedly over a period of time. Typically, a viewer must look at a program guide (which is typically displayed as a grid listing) that shows the various times and channels that the pay per view program is available and select a time and channel for transmitting the pay per view program to the program receiver. The viewer must then make sure that he or she is not viewing or recording another program at the time selected for viewing the pay per view program.

There is therefore a need for transmitting a pay per view program for a user to view without requiring the viewer to select the channel and time for the transmitting of the program. The viewer should not have to concern him or herself with whether transmitting of the pay per view program conflicts with other programs that the viewer may be watching and/or recording.

SUMMARY OF THE INVENTION

An aspect of the present invention may be regarded as a method of selecting a pay per view program to be transmitted to a program receiver. A schedule of pay per view programs is obtained. Each of the pay per view programs in the schedule has a title and at least one transmission time and an associated transmission channel for each transmission time. A menu including the titles of the pay per view programs is generated based on the schedule. The menu is provided to a display device for display to a user. A selection is received from the user of a title of a pay per view program in the menu to be received by the program receiver. A potential transmission time of the pay per view program to be received by the program receiver is determined based on the transmission times of the pay per view program in the schedule.

The method may also determine whether an availability status of a content delivery path is "available" at a predetermined time prior to the potential transmission time. If the availability status of the content delivery path is "available" at the predetermined time prior to the potential transmission time, transmission of the pay per view program is requested at the potential transmission time on the associated transmission channel. If the availability status of the content delivery path is "not available" at the predetermined time prior to the potential transmission time, determining another potential transmission time and availability status is repeated until the availability status of a content delivery path is "available."

If a program is scheduled to be recorded during the potential transmission time, the availability status of the content delivery path is determined to be "not available." However, if there is not a program scheduled to be recorded during the potential transmission time, then at a predetermined time period prior to a potential transmission time, a change channel request to change to the associated transmission channel for the potential transmission time may be displayed. The method then waits a predetermined wait for response time for a response to the change channel request from the user. If a positive response to the change channel request is received from the user, the availability status of the content delivery path is determined to be "available." If a negative response to the change channel request is received from the user, the availability status of the content delivery path is determined to be "not available." If a response to the change channel request is not received from the user within the predetermined wait for response time for receiving the change channel request, the availability status of the content delivery path is determined to be "available."

There may be a plurality of content delivery paths with each content delivery path having an associated availability status. If there is a plurality of content delivery paths, the logic for determining availability may be repeated for each of the content delivery paths.

The method may also include receiving the pay per view program at the potential transmission time on the associated transmission channel. A screen overlay may be displayed to prevent viewing of the pay per view program during receipt of the pay per view program. The method may also include storing the pay per view program and making the pay per view program available for viewing. The pay per view program may be stored on a hard disk drive. Making the pay per view program available for viewing may include displaying a notification that the pay per view program is available for display.

Receiving an identification of a pay per view program to transmit from a user may also include receiving a payment authorization from the user.

Another aspect of the present invention may be regarded as a method of recording and accessing a pay per view program using a personal video recorder. A pay per view program to be transmitted to a personal video recorder is determined. The pay per view program is transmitted to the personal video recorder, free of the user's request. The transmitted pay per view program is recorded in the personal video recorder. After the transmitted pay per view program is recorded, a user interface is displayed on a display device coupled to the personal video recorder. The user interface includes a title of the recorded pay per view program. The user may access the pay per view program. Accessing the pay per view program may include receiving a payment authorization from the user.

Determining the pay per view program to be transmitted to the personal video recorder may be based on a user profile. Determining the pay per view program to be transmitted to the personal video recorder may be based on a list of selected pay per view programs Another aspect of the present invention may be regarded as a personal video recorder for receiving a pay per view program. The personal video recorder includes: at least one content delivery path for receiving the pay per view program; an external interface configured to facilitate communications between the personal video recorder and a provider of the pay per view program; and a controller connected to the content delivery path and the external interface. The controller is configured to receive a schedule for the pay per view program via the external interface, to determine when there is at least one content delivery path having an available status at a scheduled time for the pay per view program, and to request a receipt of the pay per view program on the content delivery path having the available status.

The personal video recorder may include a storage device connectable to the controller for storing the pay per view program. The storage device may be a hard disk drive.

The personal video recorder may include a viewer control interface connectable to the controller that is configured to transmit signals to the controller indicating a viewer selection of the pay for view program to be transmitted.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

FIG. 4 illustrates an exemplary program guide showing a plurality of available pay per view programs.

DETAILED DESCRIPTION OF THE PREFERRED EMBODIMENTS

The present invention includes a system and a method for transmitting a pay per view program to a personal video recorder (PVR) 22 for future viewing on a display 26. In exemplary embodiments, the user is provided with a list or menu of titles of available pay per view programs. The user may select a pay per view program to be transmitted to the PVR 22 from the menu of pay per view program titles. The selected pay per view program is transmitted to the PVR 22 at a time that does not conflict with other programs being recorded and/or viewed by the user. Once the pay per view program is transmitted to the PVR 22, the user can view the program at his or her convenience. Other embodiments transmit pay per view programs to the PVR 22 without a specific request from the user. For example, pay per view programs may be transmitted based on user preferences or based on programs that are being showcased during a particular time period.

Figure 1:
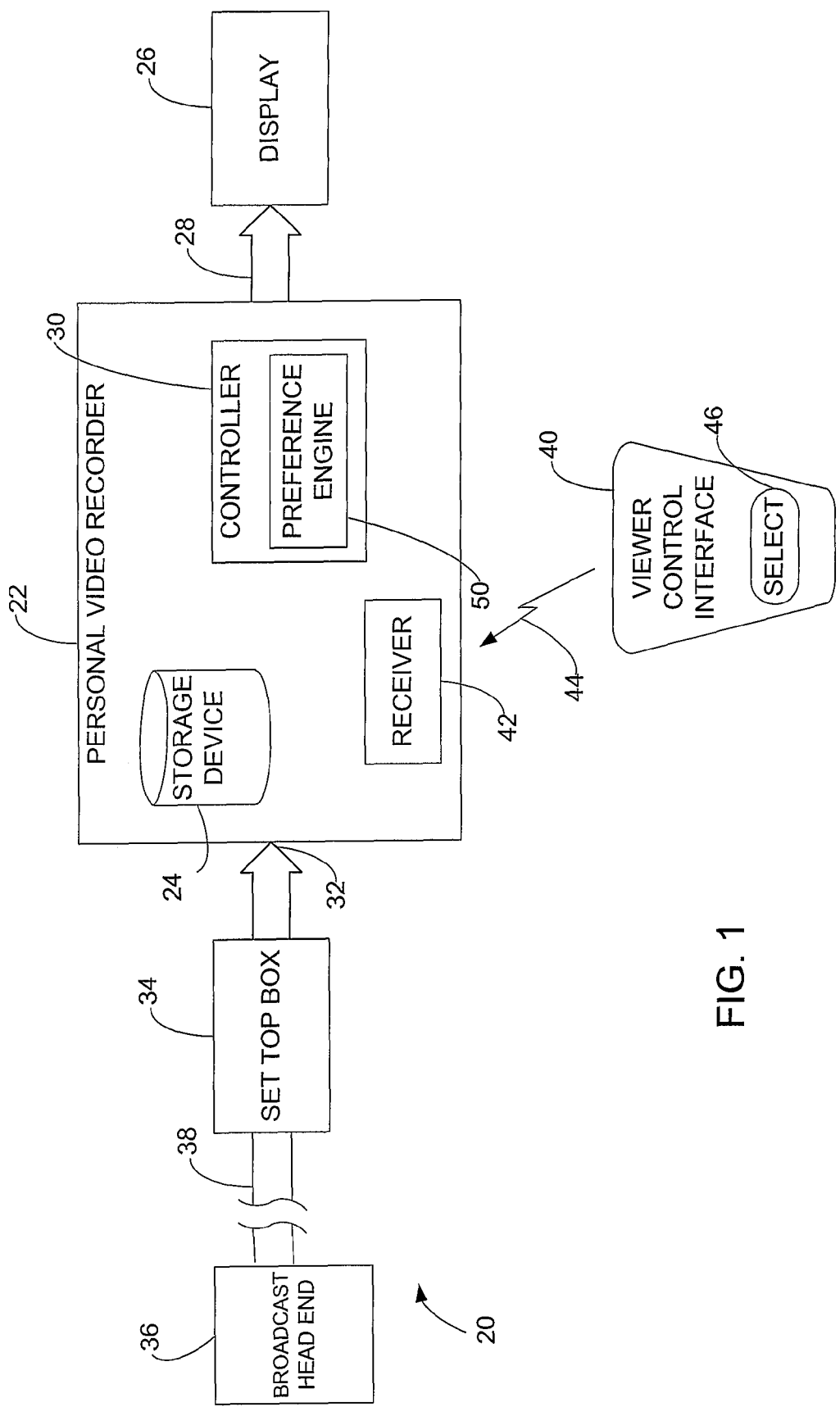
FIG. 1 shows a system for selecting a pay per view program to be transmitted to a program receiver formed in accordance with the present invention.

Referring now to the drawings wherein the showings are for purposes of illustrating preferred embodiments of the present invention only, and not for purposes of limiting the same, FIG. 1 shows an embodiment of a system 20 for displaying a broadcast stream, such as streaming video data in accordance with the present invention. The broadcast stream includes pay per view programs, such as pay per view movies. The system 20 includes a PVR 22 connected through a data line 28 to a display 26, a set top box 34 connected to a port 32 of the PVR 22, a broadcast head end 36 connected through a cable 38 to the PVR 22, and a viewer control interface 40, such as a remote control. Content is delivered from the broadcast head end 36 to the PVR 22 via a content delivery path through port 32. In the exemplary embodiment illustrated, there is one content delivery path. In other words, the PVR 22 includes a single channel receiver 42. However, it will be appreciated that the PVR may include a multi-channel receiver. If the PVR includes a single channel receiver, then if the user is viewing a particular channel, another channel cannot be recorded at that time. However, if the PVR includes a multi-channel or multi-tuner receiver, the viewer may be viewing a particular channel at the same time that a program is being recorded on another channel.

The PVR 22 also includes a controller 30 that includes a preference engine 50. The controller 30 receives signals from the viewer control interface 40 indicating viewer interactions with the viewer control interface. For example, the signals may indicate a channel selection command, a selection of a pay per view program to be transmitted, a response to a change channel request, etc. The preference engine 50 includes logic for defining a profile and selecting a pay per view program to request based on the profile. For example, a viewer's viewing habits are tracked and analyzed in order to determine the types of programming that the viewer is likely to prefer. For example, one viewer may have a tendency to view comedies, while another viewer may have a preference for dramas, another viewer may prefer sports, yet another viewer may tend to watch sports and comedy programs, etc.

The PVR 22 also includes a storage device 24. The storage device 24 stores received pay per view programs for future viewing. In exemplary embodiments of the invention, the storage device 24 is a hard disk drive, such as is manufactured by Western Digital Technologies Inc. of Lake Forest, Calif.

It will be appreciated that the system 20 of the present invention may include configurations other than the one illustrated in FIG. 1. For example, the PVR 22 and set top box 34 may be integrated into a single device rather than two separate devices. The system may also include a modem connected to the set top box 34 or the PVR 22. The modem may be an internal or external modem connected to a public switched telephone network (PSTN) or to a (coaxial) cable. In the latter case, the modem is referred to as a cable modem.

Figure 2:
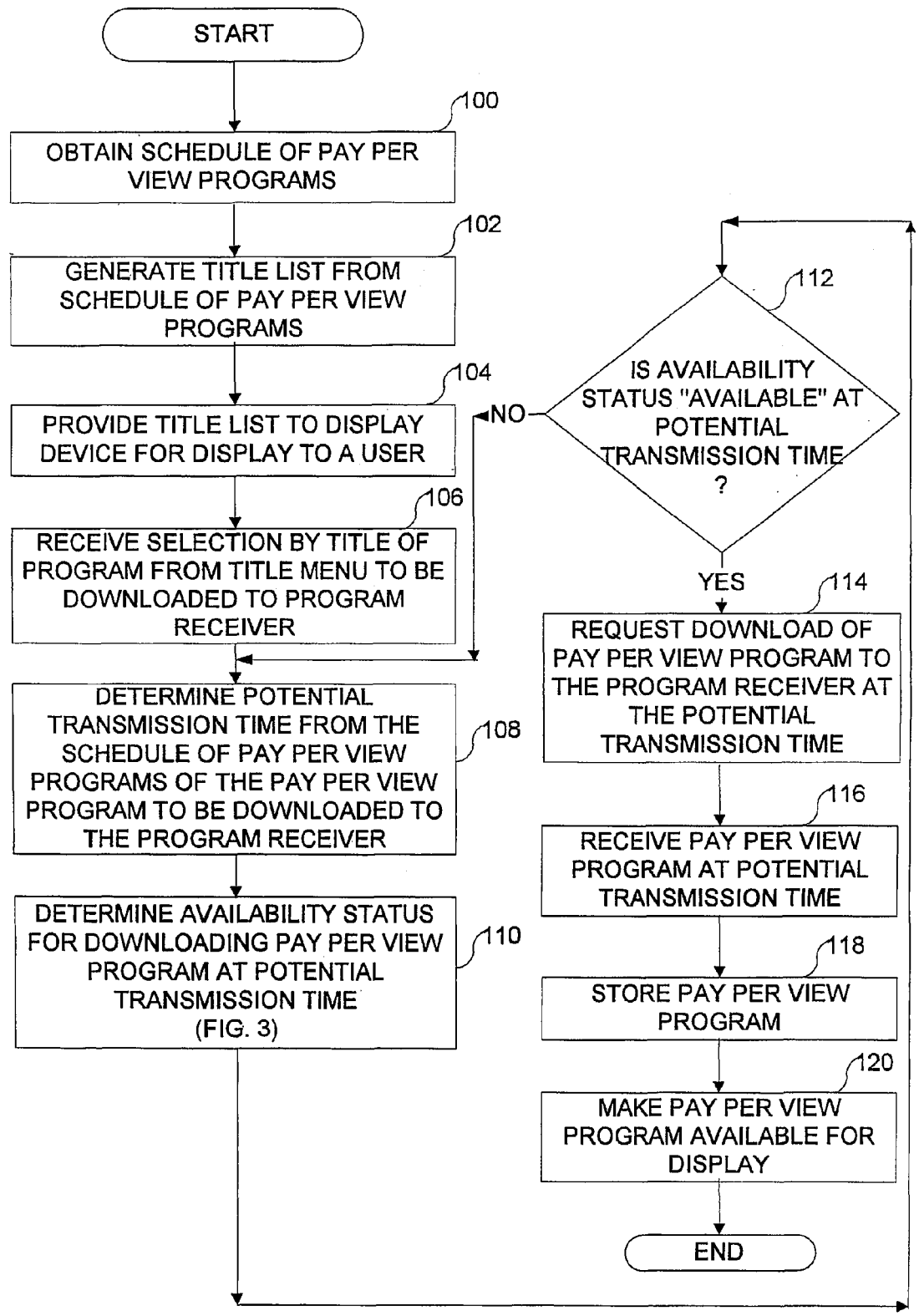
FIG. 2 is a flow chart illustrating exemplary logic for selecting a pay per view program to be transmitted to a program receiver in accordance with the present invention.

FIG. 2 is a flow diagram illustrating exemplary logic of a method for selecting a program to be transmitted to a program receiver, such as a personal video recorder 22. The logic moves from a start block to block 100 where a schedule of pay per view programs is obtained. In exemplary embodiments, the schedule of pay per view programs is extracted from a program guide, such as the electronic program guide 50 shown in FIG. 4.

The exemplary electronic program guide 50 shown in FIG. 4 includes three pay per view programs identified as Title A, Title B and Title C. As can be seen in the electronic program guide 50 of FIG. 4, the pay per view programs may be transmitted to the PVR 22 at various times and on various channels. Typical broadcasting systems have some form of program guide, such as the one shown in FIG. 4. The program guides are typically displayed on a dedicated channel. The program guide shown in FIG. 4 is an excerpt that only shows twelve channels over a three-hour time period. An actual program guide includes all of the available channels on a broadcast network, a cable system or a satellite delivery system. For example, the program guide may include network television channels, cable channels and pay per view channels. Thus, it takes a significant period of time to display all of the channels in a program guide for a particular period of time. In some systems, the user may scroll through a selected time period, for example the user may be able to view the program guide for the next week or the next two weeks. It is very time consuming for a user to search through the program guide to decide which pay per view programs, if any, should be requested to be transmitted to the program receiver 42. After the user requests a program or programs to be transmitted to the program receiver 42, the user must then decide the time and channel for transmitting the program to the program receiver 42. As described below, the present invention allows the user to select a pay per view program to receive by selecting a title from a menu or list of available program titles.

Figure 5:
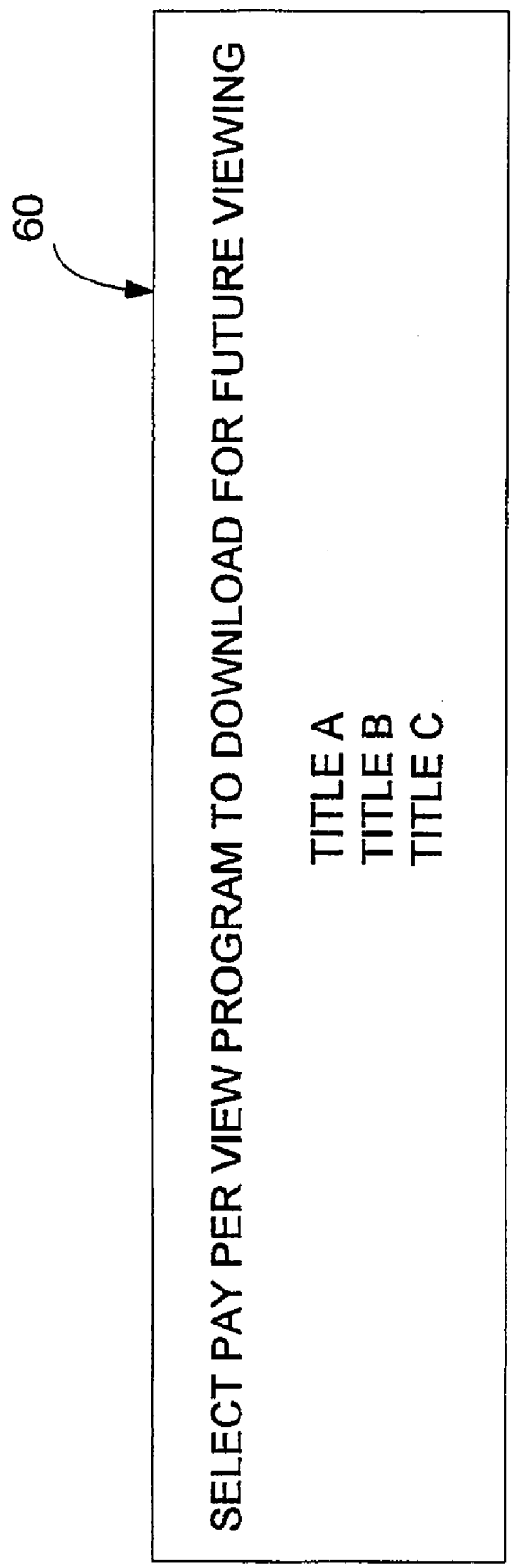
FIG. 5 illustrates a listing by title of the available pay per view programs listed in the exemplary program guide shown in FIG. 4.

Returning to FIG. 2, the logic proceeds to block 102 where a title list is generated from the schedule of pay per view programs. FIG. 5 illustrates an exemplary title list. The exemplary title list shown in FIG. 5 displays the titles of the pay per view programs that were extracted from the program guide shown in FIG. 4. It will be appreciated that the title list may include additional information, for example the title list may include a price of the pay per view program and/or availability of the pay per view program. Next, the logic of FIG. 2 moves to block 104 where the title list is provided to a display device for display to a user. The present invention allows the user to select a pay per view program to be recorded based on the title, as contrasted with the conventional method of having the user select the pay per view program to be transmitted based on time and channel found in a program guide as described above. The logic then proceeds to block 106 where selection from the title menu of a program to be transmitted to the program receiver 42 is received from the user. In exemplary embodiments, the request from the user to transmit the pay per view program includes a payment authorization from the user.

The logic then moves to block 108 where a potential transmission time of the pay per view program to be transmitted to the program receiver is determined. The potential transmission time is determined based on the transmission times obtained in block 100 from the schedule of pay per view programs, such as a program guide as shown in FIG. 4. In exemplary embodiments, the potential transmission time is the next potential transmission time. For example, if the current time is 7:05 P.M. and the program identified as Title A is selected for transmitting, the next potential transmission time is 7:30 P.M. on channel 103.

Figure 3:
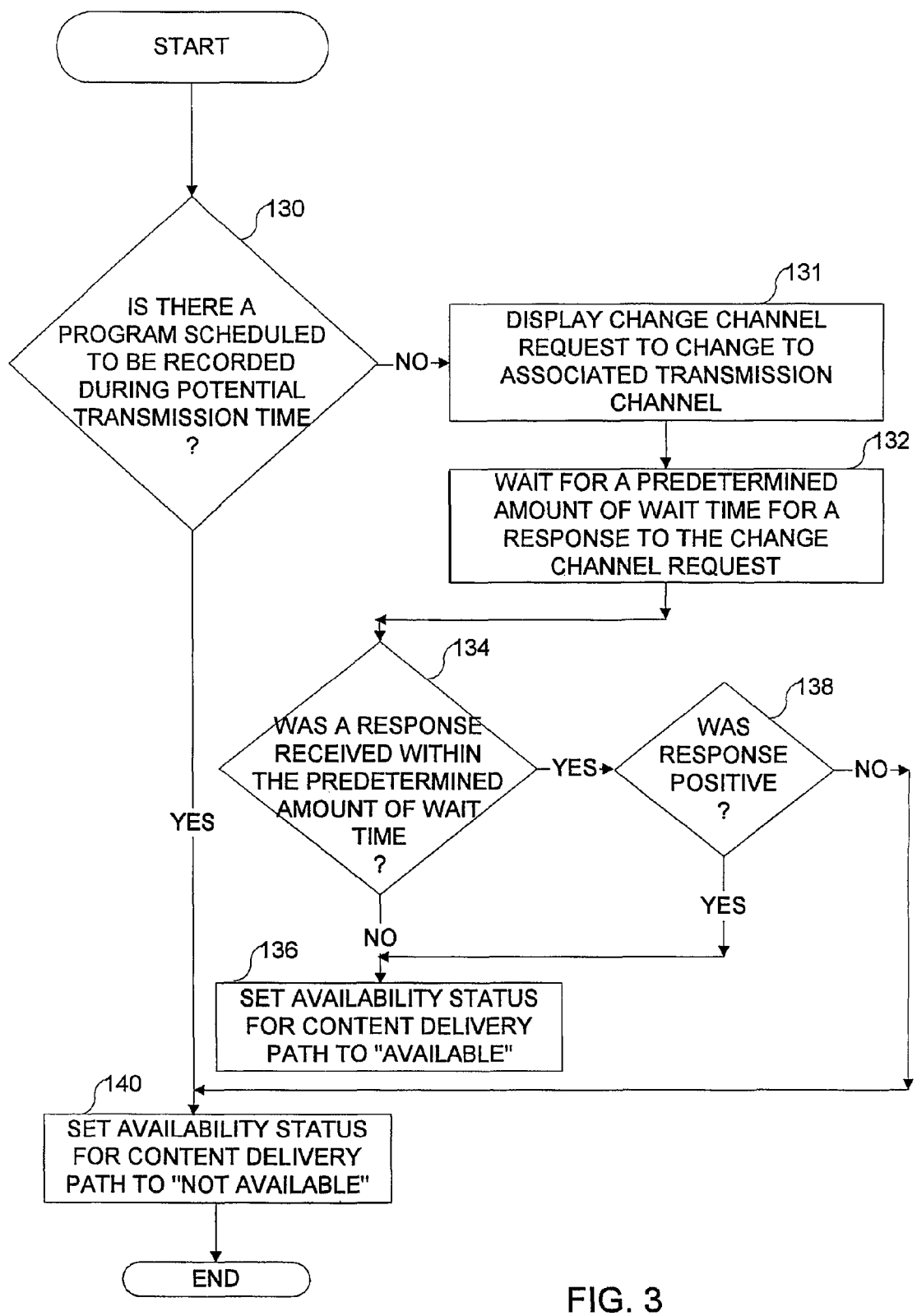
FIG. 3 is a flow chart illustrating exemplary logic for determining availability status for transmitting a requested pay per view program.

Next, the logic proceeds to block 110 where an availability status for transmitting the pay per view program at the potential transmission time is determined. FIG. 3 illustrates exemplary logic for determining availability status for transmitting the pay per view program at the potential transmission time.

The logic of FIG. 3 moves from a start block to decision block 130 to determine if there is a program scheduled during the potential transmission time. If so, the logic moves to block 140 where the availability status is determined to be "not available." The logic of FIG. 3 then ends and processing returns to FIG. 2.

If, however, there are not any programs scheduled to be recorded during the potential transmission time (no in decision block 130), the logic moves to block 131 where a change channel request to change to the transmission channel associated with the potential transmission time is displayed to the user. For example, a message such as "Title A scheduled to be recorded at 7:30 P.M. O.K. to change channel?" may be displayed to the user at 7:27 P.M. The logic then moves to block 132 to wait a predetermined period of time, for example, one minute, for a response from the user to the change channel request. In exemplary embodiments, the change channel request message continues to be displayed for the predetermined period of time for waiting for a response or until a response is received from the user. If the response to the change channel request is not received from the user within the predetermined wait for response period of time (no in decision block 134), the logic moves to block 136 where the availability status for the content delivery path is determined to be "available." For example, if no response was received from the user, it can be assumed that the user is not currently viewing the display. If a positive response is received from the user, the logic moves from decision block 138 to block 136 where the availability status for the content delivery path is set to "available." If, however, a negative response is received from the user, the logic moves from decision block 138 to block 140 where the status for content delivery path is determined to be "not available." After the availability status has been determined ("available" in block 136 or "not available" in block 140), the logic of FIG. 3 ends and processing returns to FIG. 2.

Returning to FIG. 2, after the availability status for transmitting the pay per view program at the potential transmission time has been determined, the logic moves to decision block 112 where a decision is made based on the availability status for transmitting the pay per view program at the potential transmission time on the content delivery path. If the availability status is "available" at the potential transmission time (yes in decision block 112), the logic proceeds to block 114 where a transmission of the pay per view program at the potential transmission time is requested. The process of requesting a transmission of the pay per view program is the same as if the user had selected the time and channel from a program guide. The requested pay per view program is received by the program receiver 42 of the PVR 22 at the potential transmission time. See block 116.

The received pay per view program is stored at the program receiver in block 118. In exemplary embodiments, while the pay per view program is being received, a screen overlay is displayed so that the pay per view program cannot be viewed while the program is being received at the program receiver. For example, a screen overlay may be displayed in circumstances where the pay per view program is being transmitted to the program receiver prior to payment authorization, for example, when a pay per view program is transmitted based on a selection made by a preference engine or from a list of pre-selected programs, such as programs currently being showcased. Various formats can be used for the screen overlay. For example, the screen overlay may be static or may include some form of animation. The screen overlay may include advertising information or may include text, for example notifying the user about the program currently being downloaded. It is likely that the user may not see such a screen overlay because the preferred time for downloading pay per view programs is when the user is not currently using the personal video recorder 22 to record or view another program.

After the pay per view program is stored at the program receiver 42, the logic moves to block 120 where the pay per view program is made available for display. In exemplary embodiments, a notification is displayed to the user that the pay per view program is available for display. For example, the notification may be a textual message such as, "Title A is available for viewing." In exemplary embodiments, a user can view a list of stored programs that are available for viewing. The user can then select (for example using a select button 46 on a viewer control interface 40) a stored program to be viewed. The logic of FIG. 2 then ends.

If, however, the availability status is "not available" (no in decision block 112), the logic returns to block 108 to determine a new potential transmission time of the pay per view program to be transmitted to the program receiver. The logic of blocks 108 through 112 is repeated until the availability status for the content delivery path is "available" at a potential transmission time. In exemplary embodiments, if the potential transmission time is the last potential transmission time for the pay per view program to be transmitted, a message will be displayed to the user warning the user that if the user does not allow the channel to be changed, the pay per view program will not be transmitted.

The exemplary logic shown in FIG. 2 and described above is for a single channel receiver that has one content delivery path. Alternate embodiments for multi-channel receivers have multiple delivery paths. In such embodiments, the logic of FIG. 3 is repeated for each of the content delivery paths until a content delivery path has an availability status of "available" for a potential transmission time.

The exemplary embodiment illustrated in FIG. 2 and described above is directed to a user selecting the pay per view program to be transmitted. Other embodiments include transmitting a selected pay per view program without a user request. The viewer can then access the program. In exemplary embodiments, once the pay per view program is stored, the viewer can watch the program at any time after the viewer has provided a payment authorization for the pay per view program. Various embodiments include a preference engine (also known as a recommendation engine, for example, Copilot™) 50 that determines which pay per view programs the user is likely to want to view. The preference engine 50 may select pay per view programs to transmit based on previous viewing habits of the user, demographic information known about the user or some combination thereof.

In other embodiments, the decision of the pay per view programs to transmit is based on a list of programs to transmit. For example, a pay per view provider may have one or more pay per view programs that it wants to showcase during a particular period of time. In embodiments where pay per view programs are transmitted without a specific request from the user, a display is made available to the user showing the user the available pay per view programs. In exemplary embodiments, the user requests the list of available pay per view programs. Upon selection of a pay per view program to be viewed by the user, the user provides a payment authorization prior to viewing the pay per view program that was transmitted without the user's request.

What is claimed is:

1. An electronic device for receiving a pay per view program, the device comprising:
a port capable of connecting to a broadcast stream to receive programming from a content provider;
a storage device capable of storing at least one program received from the content provider;
a media interface capable of connecting to a media device;
a receiver capable of receiving input from a user; and
a controller in communication with the port, the media interface, the receiver, and the storage device, the controller having instructions executable to:
obtain a list of available pay per view programs, each of the pay per view programs being able to be transmitted at least one transmission time;
generate a menu comprising an indication of at least one pay per view program, based on the list;
provide the menu to the media device through the media interface for presentation to a user;
receive, through the receiver, a selection of the pay per view program from the menu to be received by the device;
determine a potential transmission time of the pay per view program to be received based on the at least one transmission time associated with the program;
determine if an availability status of a content delivery path indicates that it is available at the potential transmission time;
when the availability status of the content delivery path indicates that it is not available at the potential transmission time, redetermine the availability status based on another of the at least one transmission times until the availability status indicates that the content delivery path is available or the availability status has been determined to indicate that the content delivery path is not available for all of the at least one transmission times;
when the availability status of the content delivery path indicates that it is available, request access to the pay per view program at the potential transmission time; and
wherein in order to determine if an availability status indicates that it is available at a potential transmission time, the processor executes instructions to:
determine if a program is scheduled to be recorded during the potential transmission time;
when a program is scheduled to be recorded during the potential transmission time, set the availability status to indicate unavailability;
when no programs are scheduled to be recorded during the potential transmission time, at a time period prior to the potential transmission time:
(1) send a change channel request to change to the associated transmission channel for the potential transmission time to the media device through the media interface;
(2) wait for a response from the input interface for an amount of time;
(3) if the response received is positive, set the availability status to indicate that it is available;
(4) if the response received is negative, set the availability status to indicate that it is not available; and (5) if the response is not received within the amount of time, set the availability status to indicate that it is available.

2. The device of claim 1 wherein the controller is adapted to store the pay per view program when it request access to the pay per view program.

3. The device of claim 2 further comprising a preference engine, the preference engine adapted to select pay per view programs for transmission and storage in the storage device based on a user profile.

4. The device of claim 3 wherein the preference engine is adapted to track program interests to create the user profile.

5. The device of claim 3 wherein the controller restricts the viewing of a preference engine selected pay per view program until it receives a payment authorization from the user.

6. The device of claim 5 wherein the payment authorization is transmitted through the receiver.

7. The device of claim 1 wherein the media device comprises a television and the program comprises a television program.

8. The device of claim 1 wherein the process further comprises instructions to cancel the pay per view program when the availability status indicates that it is not available for all of the at least one transmission times.

9. A method of selecting a pay per view program to be transmitted to a program receiver, the method comprising:
   a. obtaining a list of pay per view programs at the program receiver, each of the pay per view programs able to be transmitted at least one transmission time;
   b. generating a menu comprising at least one pay per view program, based on the list;
   c. providing the menu to a display device for display to a user;
   d. receiving from the user a selection of the pay per view program from the menu to be received by the program receiver;
   e. determining a potential transmission time of the pay per view program to be received by the program receiver;
   f. determining an availability status of a plurality of content delivery paths at a time prior to the potential transmission time, comprising:
      i. determining if one or more programs are scheduled to be recorded during the potential transmission time;
      ii. when one or more programs are scheduled to be recorded during the potential transmission time, determining if the plurality of content delivery paths can handle the selected pay per view programs in addition to the one or more programs scheduled to be recorded;
      iii. when the plurality of content delivery paths cannot handle more programs than the one or more programs scheduled to be recorded, setting the availability status of the plurality of content delivery paths to indicate that they are not available;
      iv. when the plurality of content delivery paths can handle more programs than the one or more programs scheduled to be recorded during the potential transmission time, at a second time period prior to the potential transmission time:
         (1) determining whether a user is utilizing a last available path of the plurality of content delivery paths;
         (2) when the user is utilizing the last available of the plurality of content delivery paths:
            (A). displaying a change channel request to begin access of the selected par per view program at the potential transmission time;
            (B). waiting a predetermined wait for response time for a response to the change channel request from the user;
            (C). when the response to the change channel request received from the user is positive, setting the availability status to indicate that it is available;
            (D). when the response to the change channel request received from the user is negative, setting the availability status to indicate that it is not available; and
            (E). when the response to the change channel request is not received from the user within the predetermined wait for response time for receiving the change channel request, setting the availability status to indicate that it is available; and
         (3) when the user is not utilizing the last of the plurality of content delivery paths, setting the availability status to indicate that it is available; and
   g. when the availability status indicates that it is available, requesting access to the pay per view program at the potential transmission time on an available one of the plurality of transmission channels.

10. The method of claim 9 further comprising when the availability status indicates that it is not available at the potential transmission time, repeating steps e-g until the availability status indicates that it is available or until a user cancels the pay per view program.

11. The method of claim 10 further comprising when the availability status indicates that it is not available at the potential transmission time, repeating steps e-g until the availability status indicates that it is available or until no more potential transmission times exist for the pay per view program.

12. The method of claim 11, wherein, prior to step g, when availability of a channel for the last potential transmission time is being determined, warning the user that the pay per view program will be cancelled if the response to the change channel request is not positive.

13. The method of claim 10, further comprising:
receiving the pay per view program at the potential transmission time.

14. The method of claim 13, further comprising:
storing the pay per view program; and
making the pay per view program available for viewing.

15. The method of claim 14, wherein the pay per view program is stored on a hard disk drive.

16. The method of claim 14, wherein step j further comprises displaying a notification that the pay per view program is available for display.

17. The method of claim 9, further comprising receiving a payment authorization from the user.

* * * * *